United States Patent [19]
Mims

[11] Patent Number: 5,630,496
[45] Date of Patent: May 20, 1997

[54] APPARATUS AND METHOD FOR FLIPPING AND POSITIONING ARTICLES

[75] Inventor: Herman D. Mims, Ellenboro, N.C.

[73] Assignee: Machine Builders and Design, Shelby, N.C.

[21] Appl. No.: 413,832

[22] Filed: Mar. 30, 1995

[51] Int. Cl.$^6$ .................................................. B65G 47/24
[52] U.S. Cl. ..................... 198/374; 198/399; 198/406; 198/463.4
[58] Field of Search ....................... 198/374, 399, 198/400, 402, 406, 463.4, 463.6

[56] References Cited

U.S. PATENT DOCUMENTS

| | | | |
|---|---|---|---|
| 2,911,891 | 11/1959 | Taylor | 198/374 |
| 3,070,211 | 12/1962 | Williamson | 198/374 X |
| 3,642,114 | 2/1972 | Crispe et al. | 198/374 |
| 3,970,218 | 7/1976 | Lee | 198/399 X |
| 4,067,433 | 1/1978 | Phipps | 198/374 |
| 4,307,800 | 12/1981 | Joa | 198/374 |
| 4,907,686 | 3/1990 | Cotic | 198/399 X |
| 5,106,075 | 4/1992 | Wafford et al. | 198/374 X |
| 5,287,953 | 2/1994 | Mims | 198/374 |
| 5,291,983 | 3/1994 | Pegoraro et al. | 198/399 |

*Primary Examiner*—D. Glenn Dayoan
*Attorney, Agent, or Firm*—Sughrue, Mion, Zinn, Macpeak & Seas

[57] ABSTRACT

An apparatus for receiving, in an infeed section, a stream of distributed items deposited in rows of like position. A slide mechanism is is selectively movable between a slide position and a flip position. In the slide position, the item drops off the edge of the belt and slides across the primary slide surface and onto a second slide mechanism having a secondary slide surface that is positioned to be in substantially the same plane as the primary slide surface. The slide mechanism is moved into the flip position for every other row of items. The items to be flipped come off the conveyor belt and come into contact with an abutting surface. This surface changes the direction of the item as it moves towards the transport mechanism in conjunction with a reverse slide surface of the second slide mechanism. The item slides down the reverse slide surface on its top surface, thus flipping over approximately 180° from its orientation on the infeed conveyor belt. A first row of items fed from the infeed conveyor is flipped and is subsequently held on the transport mechanism by a gate while a second row of items is allowed to slide directly onto the transport mechanism at a position in front of the first row. A plurality of rows can be conveyed by the transport mechanism to the filling and capping stations of an automatic sandwich making system, with alternate rows oriented with their bottom surfaces facing upwards from the surface of the transport mechanism at a high speed while allowing the items adequate settling time during transfer.

11 Claims, 5 Drawing Sheets

APPARATUS AND METHOD FOR FLIPPING AND POSITIONING ARTICLES

BACKGROUND OF THE INVENTION

1. Field of the Invention

The invention pertains to an apparatus and method for flipping articles. In particular, the invention relates to an apparatus for flipping selected articles from a stream of such articles so that the articles can be transported to a manufacturing process after having been flipped over approximately 180° from an initial position within the stream. The invention is particularly useful in manufacturing food articles, such as cookie sandwiches, and the like, wherein it is necessary to flip every other cookie in a stream of items released from a baking process so that an automatic cookie process can easily manufacture cookie sandwiches.

2. Description of the Related Art

In the preparation of food articles such as cookies, candies, and the like, after the items have been baked, they are transferred from an oven to an infeed conveyor belt in a stream-like manner so as to be conveyed thereby to a processing station. Where the process is for making cookie sandwiches, a filling station is required to deposit a cookie filling substance, such as cream, onto every other cookie in the stream. It was the prior practice in the baking industry to manually remove an untilled cookie from the conveyor belt and place it on the cookie having the filling substance deposited thereon. Obviously, such practice is rather labor-intensive and time consuming.

U.S. Pat. No. 5,287,953 to Mims, the inventor of the present invention, discloses a successfully automated process of producing cookie sandwiches. The patented system includes an apparatus for receiving, in an infeed section, a stream of distributed articles, such as food items and the like, deposited in rows of like position; that is, each item has a top and bottom surface, and each row is oriented such that the items have the top surface facing upwards from a conveyor belt in the infeed section. The items are allowed to exit the edge of the infeed section towards a transport mechanism, such as an endless loop conveyor belt and the like. A slide mechanism is used to retard the motion of the items as they exit the infeed section.

Figure 4:
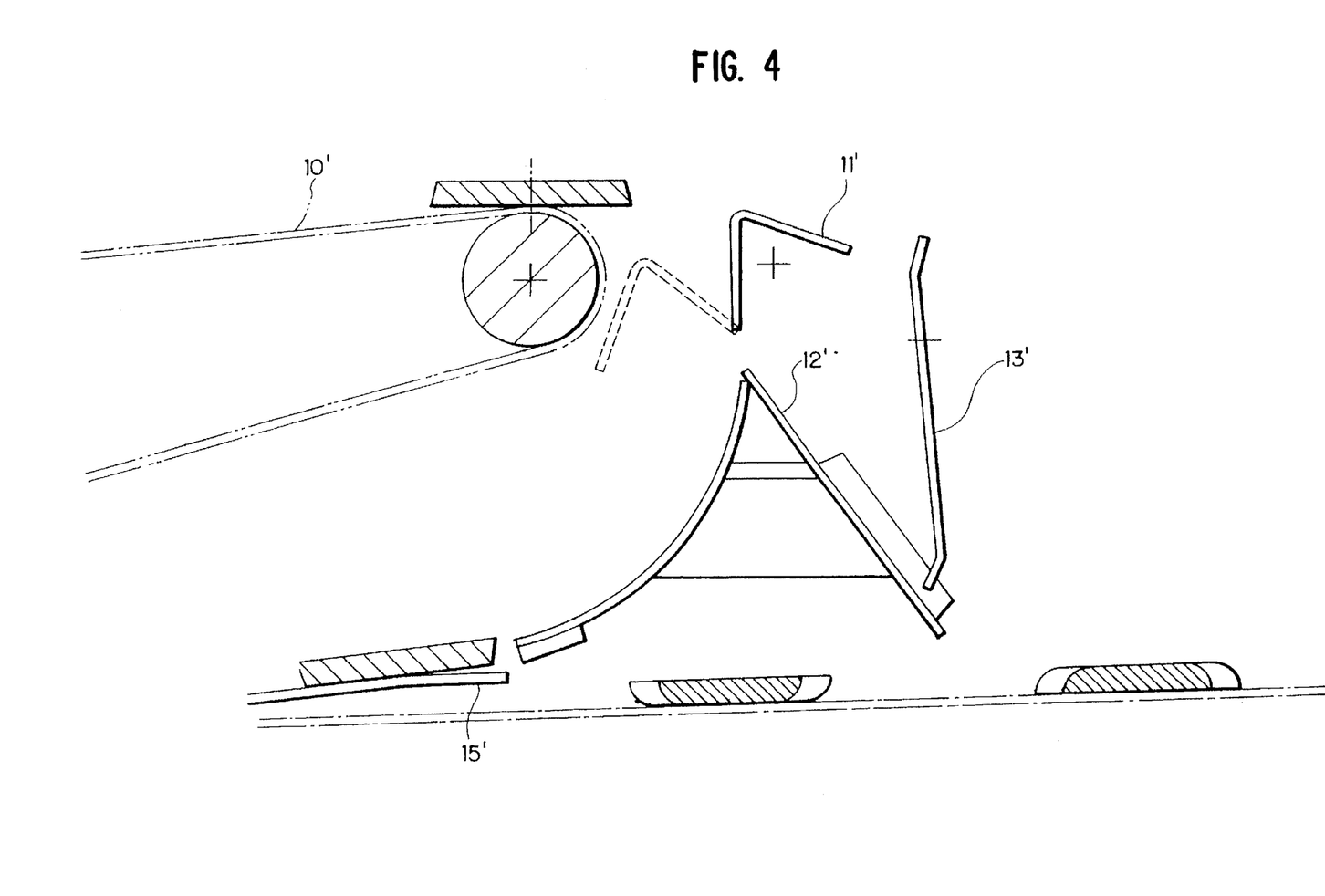
FIG. 4 illustrates the conventional device in partial cross-section.

This device is illustrated in FIG. 4. In particular, the slide mechanism 11' is selectively movable from a slide position to a flip position. In the slide position, a primary sliding surface of the mechanism is positioned directly below the edge of the infeed conveyor belt 10' such that the surface forms an angle with the horizontal plane of the belt. In operation, the item exits the edge of the belt and slides across the primary slide surface and onto a second slide mechanism 12' having a secondary slide surface that is positioned to be in substantially the same plane as the primary slide surface. The item continues to slide along the secondary surface until it comes to rest at a junction formed by the secondary surface and a snubber bar 13' stretching the entire width of the secondary slide surface.

In the flip position (see the phantom line in FIG. 4), the slide mechanism 11' is positioned directly in front of the conveyor belt edge. The slide mechanism has an abutting surface that faces the belt edge when the items are dropped from the conveyor belt. In operation, the slide mechanism is moved into the flip position for every other row of items. The items to be flipped come off the conveyor belt and come into contact with the abutting surface. This surface changes the direction of the item as it moves towards the transport mechanism in conjunction with a reverse slide surface of the second slide mechanism 12'. The item slides down the reverse slide surface on its top surface, thus flipping over approximately 180° from its orientation on the infeed conveyor belt 10'.

The flipped item is then supported above a conveying surface on retractable plate 15. Retractable plate 15' is subsequently retracted to allow the item to fall onto the conveying surface at a predetermined time relative to release of the slid item by snubber bar 13'.

A first row of items is released onto the transport mechanism by the snubber bar and then a second row is flipped and placed on the transport mechanism behind the first row. Therefore, the second row must be flipped quickly and immediately placed on the transport mechanism in order to maintain a desired pitch between items at a high throughput rate.

However, the system described above is limited in rate due to the relative allocation of time for each step because of the interdependence of the various steps. This is especially true for the flipped items which must be placed on the transport mechanism quickly. In being flipped and dropped onto the transport device, and accelerated, the flipped items are often displaced from their proper position. Also, the items are handled while undergoing oscillatory motion, due to the flipping and dropping, and thus handling errors can occur at high speeds. Finally, because position of the flipped items on the transport device is affected by the action of the retractable plate, the bounce of the item, and the friction of the transport device, positioning errors occur.

The limitations of the known device discussed above are best understood through FIG. 5, which is a timing chart for the various elements of such a device. The timing chart of FIG. 4 represents a rate of 200 rows of items per minute on a machine developed by the inventor.

Figure 5:
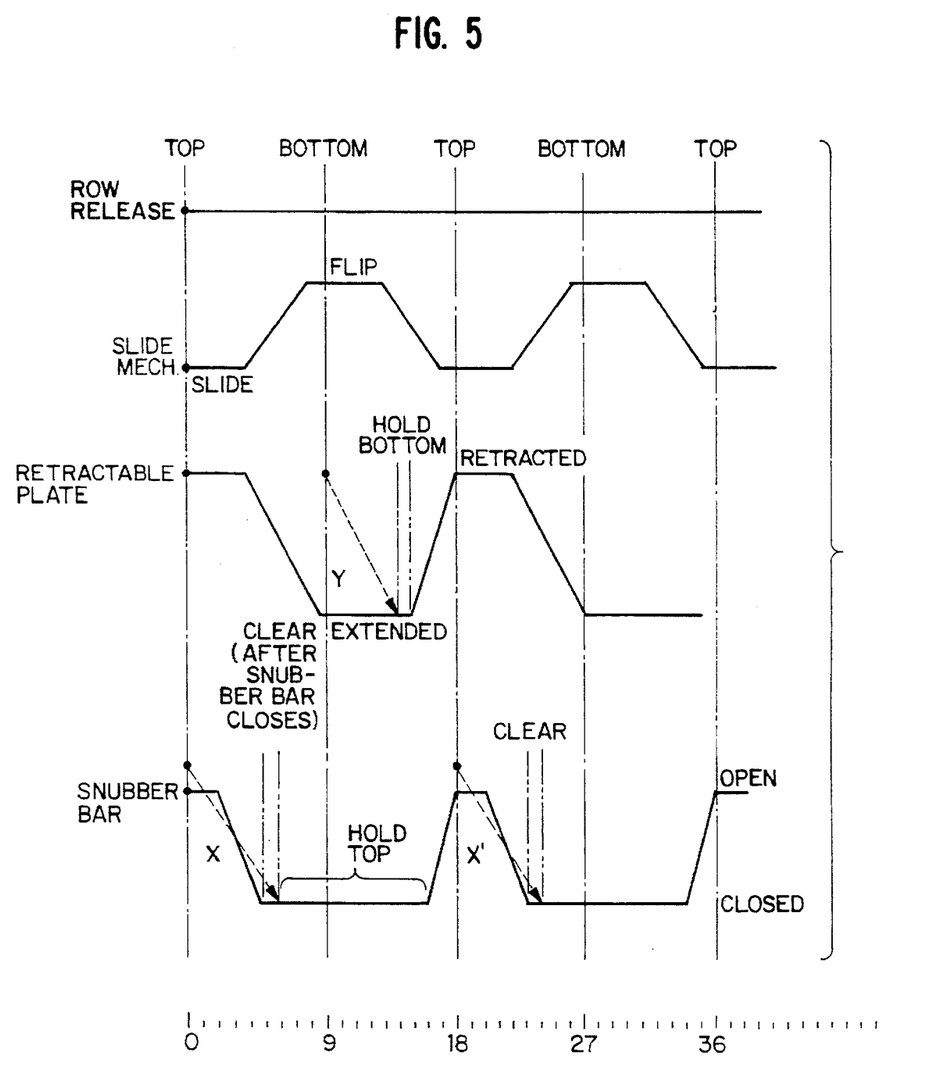
FIG. 5 is a timing diagram of the conventional device.

The timing chart of FIG. 5 utilizes time increments of 1/30 of a second for comparison purposes. However, this timing increment can vary based on the application. Notwithstanding any variance in the time increment, the relative time values remain essentially the same because the operation of each element is dependent on the other elements. This will become clear based on the discussion below.

As illustrated in curve (a) of FIG. 5, a row of items is released, i.e., comes to the end of the infeed conveyor every 9 time units. At 1/30 second per time unit, the result is 200 rows of items per minute. Specifically, a top (unflipped) item is released at 0 time units, a bottom (flipped) item is released at 9 time units, and so on. In this example, every other item is flipped and thus the slide mechanism is alternately placed in the slide and flip positions discussed above. Specifically, as a first top item comes off of the infeed conveyor, the slide mechanism is in the slide position, as a second bottom item comes off of the infeed conveyor, the slide mechanism is in the flip position, and so on, as illustrated by curve (b) in FIG. 5.

The first top item is slid along the sliding mechanism and comes to rest against the snubber bar at 6 time units as is illustrated by dotted line x in curve (d) of FIG. 5. This item is held by the snubber bar until 16 time units at which time the snubber bar is raised, i.e., opened, and the item slides onto the conveying device, as illustrated in curve (d). In the meantime, the second bottom item was released at 9 time units, flipped by the slide mechanism and reaches the retractable plate at 14 time units, as illustrated by dotted line y in curve (c) of FIG. 5. At 15 time units, the retractable plate is retracted, as illustrated in curve (c), to allow this item to drop onto the conveying device at a position behind the first item which has been released from the snubber bar as described above. Of course, this process is repeated to deposit alternately flipped and unflipped items on the conveying device with a substantially constant pitch between each item.

It is clear that the operation of the snubber bar and the retractable plate are dependent on one another in order to properly register, i.e. position, the items. Specifically, the snubber bar must remain raised for a predetermined period of time after releasing an item, about 2 time units, in order to allow the item to slide onto the conveying device. Also, the snubber bar must be lowered, i.e., closed, very quickly after this time period to catch the next item. For example, in Applicant's device, the second top cookie reaches the snubber bar at 24 time units (see dotted line x' in curve (d) of FIG. 5) and the snubber bar is completely closed at 23 time units. This leaves little room for error or increases in speed.

Further, in Applicant's device, the bottom item reaches the retractable plate at 14 time units and must be released at 15 time units in order to be properly positioned, i.e., positioned at a constant pitch with respect to the other items, on the conveying device. Therefore, the bottom item is held on the retractable plate for only one time unit, as illustrated in curve (c) of FIG. 5. This does not allow adequate time for oscillatory motion of the item to dissipate.

As is apparent from the discussion above and the curves illustrated in FIG. 5, the operations of the various elements are dependent on one another. Specifically, the retractable plate is used to control the position of the flipped items on the transport device and thus the retractable plate must be retracted immediately after the flipped item is placed thereon in order to allow the flipped item to follow the slid item. Therefore, there is not adequate settling time for allowing oscillatory motion of the flipped item, due to flipping, to dissipate. Also, additional oscillatory motion is generated as the item is dropped onto the transport device when the retractable plate is retracted. This is particularly a problem with items of irregular shape. All of this oscillatory motion, generated by the flipping and dropping of the item, as well as by friction between the transport device and the item, causes positioning errors of the flipped items and thus renders it difficult to effect additional automated handling of the items.

SUMMARY OF THE INVENTION

It is an object of the present invention to provide an apparatus and method for controlling the position of a flipped article during a manufacturing process and for orienting flipped and unflipped articles with respect to one another in a predetermined sequence.

It is an object of the present invention to provide an apparatus and method for automatically conveying, flipping, and positioning articles, such as items, cakes, candies, and the like, so that even irregularly shaped articles can be handled and processed during high-speed runs.

The present invention achieves the foregoing and other objects by providing an apparatus for receiving, in an infeed section, a stream of distributed articles, such as food items and the like, deposited in rows of like position; that is, each item has a top and bottom surface, and each row is oriented such that the items have the top surface facing upwards from a conveyor belt in the infeed section. The items are allowed to exit the edge of the infeed section towards a transport mechanism, such as an endless loop conveyor belt and the like. A slide mechanism is used to direct of the items as they are conveyed off the infeed section.

In particular, the slide mechanism is selectively movable from a slide position to a flip position. In the slide position, a primary sliding surface of the mechanism is positioned directly below the edge of the infeed conveyor belt such that the surface forms an angle with the horizontal plane of the belt. In operation, the item is conveyed off the edge of the belt and slides across the primary slide surface and onto a second slide mechanism having a secondary slide surface that is positioned to be in substantially the same plane as the primary slide surface. The item continues to slide along the secondary surface until it comes to rest at a junction formed by the secondary surface and a snubber bar stretching the entire width of the secondary slide surface.

In the flip position, the slide mechanism is positioned directly in front of the conveyor belt edge. The slide mechanism has an abutting surface that faces the belt edge when the items are dropped from the conveyor belt. In operation, the slide mechanism is moved into the flip position for selected rows of items, e.g. every other row of items. The items to be flipped come off the conveyor belt and come into contact with the abutting surface. This surface changes the direction of the item as it moves towards the transport mechanism in conjunction with a reverse slide surface of the second slide mechanism. The item slides down the reverse slide surface on its top surface, thus flipping over approximately 180° from its orientation on the infeed conveyor belt.

In the preferred embodiment, the item, having been flipped approximately 180°, comes to rest at a junction formed between a bump bar, which is horizontally positioned above the surface of the transport mechanism, and a retractable plate, slideably positioned underneath the retractable plate. The retractable plate and the snubber bar are operated to respectively release the flipped and slid items onto the transport mechanism.

A first row of items is flipped and subsequently held on the transport mechanism by a gate while a second row of items is released onto the transport mechanism in front of the first row. The gate allows the first row to be flipped and subsequently held in position for a settling period while a second row is slid onto the transport mechanism. Because of this settling period, any oscillatory motion of the item is minimized when it is transferred to the transport mechanism and thus errors are minimized. The gate is positioned above the transport device and thus the flipped items are positioned in a desired manner directly on the transport device. As a result, a plurality of parallel rows can be conveyed at a rapid rate, and in a desired relative orientation, by the transport mechanism to subsequent processing, such as the filling and capping stations of an automatic sandwich making system, wherein alternate rows of food items are oriented with their bottom surfaces facing upwards from the surface of the transport mechanism.

DETAILED DESCRIPTION OF THE PREFERRED EMBODIMENT

Figure 1:
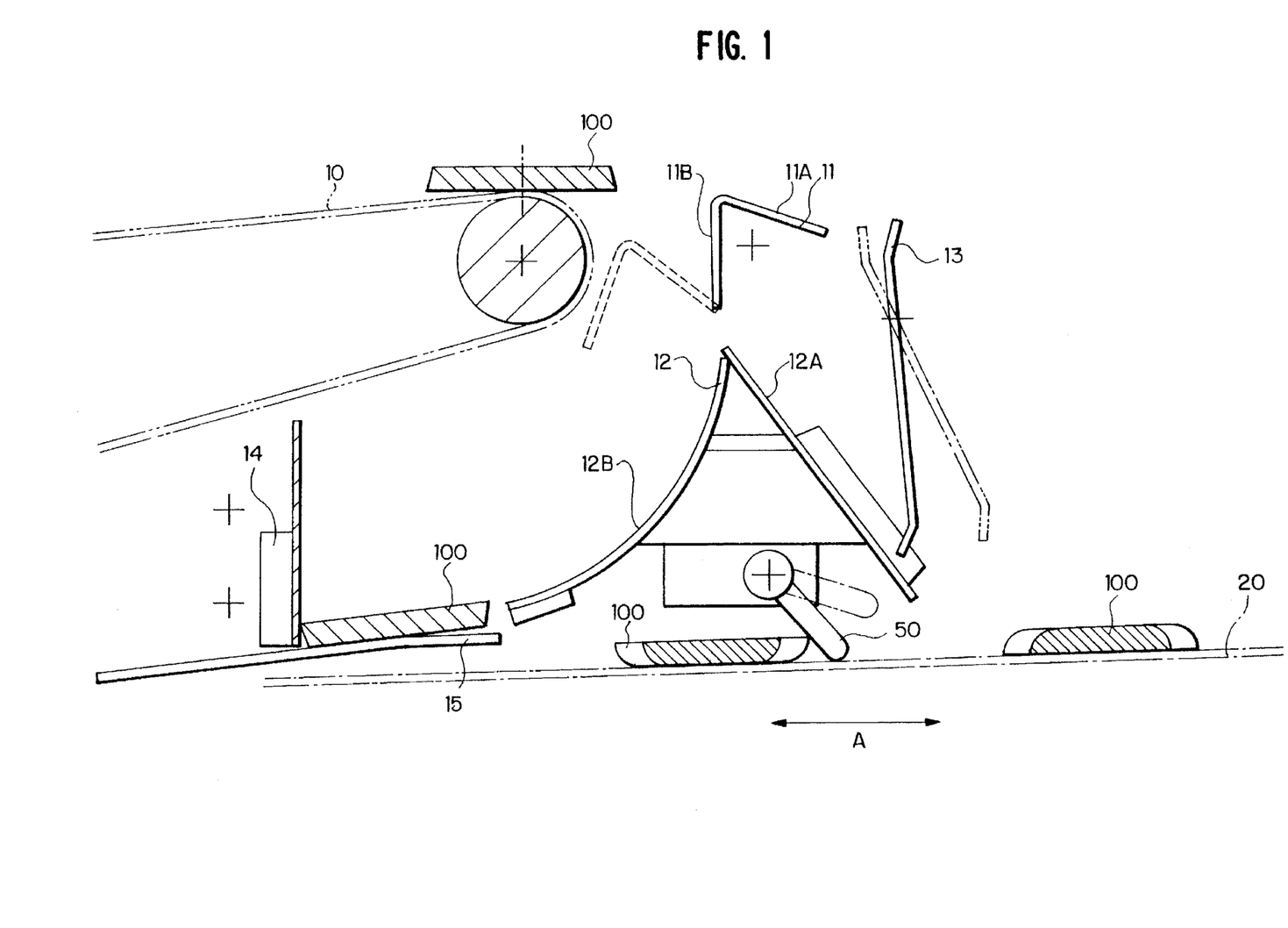
FIG. 1 illustrates a partial cross-sectional view of the preferred embodiment of the invention.

FIG. 1 illustrates the preferred embodiment of the present invention by which selected articles within a stream of articles are flipped approximately 180° from its original orientation in the stream. The articles hereinafter described are in the form of food items, such as items, cakes, candies, or the like. However, the use of such food items in the following description is for illustrative purposes only and should not be considered a limitation of the present invention. As will become apparent below, the preferred embodiment adds one element to the example discussed above. This element permits the invention to operate in a manner which is substantially different from the example.

A stream of items 100, such as cookies, are deposited with a top surface facing upward following baking or other food processing steps at an infeed section, preferably an endless loop conveyor belt 10. The items 100 are then indexed, i.e., placed in a desired relative position, by an indexing device such as that disclosed in U.S. Pat. No. 4,535,881, also to Mires, the disclosure of which is incorporated herein by reference. The conveyor belt 10 transports the indexed items 100 to the apparatus of the present invention. Preferably, the apparatus is used in conjunction with an automatic cookie sandwich making system, such as the well-known COOKIE CAPPER (tradename) sandwich system, that requires every other row of items 100 to be conveyed to a filling station (not shown) with their bottom surfaces facing upward. The bottom surface receives a cookie filling substance deposited on the surface by the filling station. The filling station may be any such station as is well-known in the art, for example, the station may be that shown in U.S. Pat. No. 4,194,443, which is also incorporated herein by reference.

After the items 100 pass the filling station, every other row, having the cookie top surfaces facing upward, is picked up at a capping station, such as that shown in U.S. Pat. No. 4,194,443, and subsequently placed on the row of items having filling substance deposited thereon.

With an automatic cookie sandwich system as described above, the apparatus of the present invention operates in two positions. In a slide position, the position of slide mechanism 11 indicated by the phantom lines, the slide mechanism 11 is positioned beneath the edge of infeed conveyor belt 10. In particular, the slide mechanism 11 has a primary slide surface 11A that is positioned to form an angle with the horizontal plane of the conveyor belt 10 such that when the stream of items 100 reaches the edge thereof, row by row the items 100 are conveyed off the conveyor belt 10 and slide down the primary slide surface 11A towards a transport mechanism 20. The primary slide surface 11A guides each cookie 100 to a secondary slide surface 12A formed on a second slide mechanism 12. The slide surface 12A is positioned such that it is within the same surface plane as primary slide surface 11A. The cookie 100 then slides down surface 12A until its motion is stopped by snubber bar 13 that forms a junction with the lower edge of the slide surface 12A.

The snubber bar 13 has a horizontal extent that spans the entire width of the slide mechanism 12 and the transport mechanism 20. The bar 13 is pivotally mounted on a shaft or the like such that it may be rotated in a counter-clockwise direction. When the snubber bar 13 is so rotated (to the position indicated by the phantom line), the cookie 100, having been registered in position at the junction formed by bar 13 and surface 12A, falls of its own weight onto the horizontal surface of the transport mechanism 20. The transport mechanism 20 is used to transport the items 100 to the filling and capping stations; preferably, the mechanism is an endless loop conveyor belt. However, any appropriate conveying mechanism can be utilized. The snubber bar 13 provides the control necessary to accurately deposit the cookie 100 onto the transport mechanism. In the flip position, the apparatus of the present invention causes the slide mechanism 11 to be raised and tilted such that it penetrates the horizontal plane of conveyor belt 10, as shown by the solid line n FIG. 1. In this manner, the stream of items reaching the edge of belt 10 will come into contact with the slide mechanism 11. In particular, the slide mechanism 11 has an abutting surface 11B that is constructed so as to receive the items 100, row by row, as they are conveyed off the belt 10. The abutting surface restricts the forward motion of each item 100 and guides it downward towards a reverse slide surface 12B of the second slide mechanism 12.

Each item 100 that is conveyed off the conveyor belt 10 and slides down the reverse slide surface 12B slides on its top surface. A bump bar 14 is provided in a position directly above the surface of the transport mechanism 20, and serves as a restricting surface for stopping the motion of each item 100 that slides down the reverse slide surface 12B.

In the preferred embodiment, a retractable plate 15 is positioned directly below the bar 14 so as to form a junction therewith at the bottom portion of the reverse slide 12B. Each item 100 falling down the slide 12B comes into contact with the bump bar 14 and comes to rest at the junction formed by the bar 14 and the plate 15 at a position above the transport mechanism 20. The retractable plate 15 is slideably movable in the direction of arrow A by an actuating device, such as an air-cylinder or the like, such that it can be retracted to a position behind the extent of the bump bar 14. By retracting the plate 15 in this manner, the item 100 positioned at the aforementioned junction is released and allowed to fall downward onto the surface of the transport mechanism 20.

Flip gate 50 is positioned directly above a surface of transport device 20 to selectively stop and hold flipped items 100 while they are disposed on transport device 20. Specifically, flip gate 50 is selectively movable between a lowered position in which the items 100 are stopped thereby (see the solid line in FIG. 1), and a raised position in which the items 100 are allowed to be transported by transport device 20 (see the phantom line in FIG. 1). The gate can be actuated by known air cylinders, solenoids, or the like. Remaining elements of the preferred embodiment can be actuated and controlled by known mechanical elements or electrical elements, such as those disclosed in U.S. Pat. No. 5,287,953.

Figure 2:
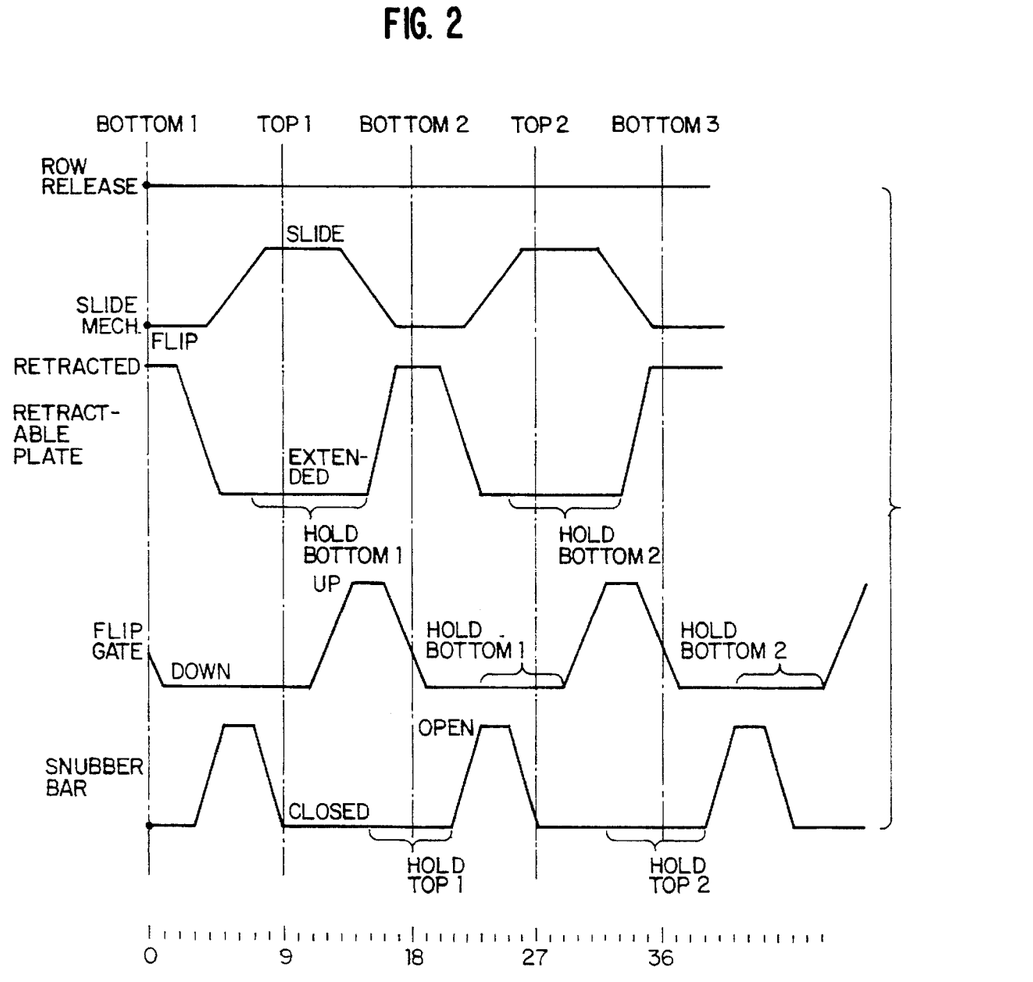
FIG. 2 is a timing diagram of the various elements of the preferred embodiment.

As noted above, flip gate 50 allows the preferred embodiment to operate in a substantially different manner from known devices. Specifically, the invention can utilize a control timing which allows adequate settling periods for the items 100 as they are transported. FIG. 2 is a timing diagram of the preferred embodiment. The horizontal axis of FIG. 2 represents time in incremental units. For example, each unit can be 1/30 of a second. At this timing, 200 rows of items per minute can be handled. Smaller incremental time periods allow the invention to handle up to 300 rows per minute. Other than the addition of the gate 100, the inventive apparatus on which testing was conducted is identical to that of the example discussed above. Accordingly, the benefits of the gate 100 can be readily ascertained based on FIG. 2.

As illustrated in curve (a) of FIG. 2, a row of items 100 is released from infeed conveyor 10 every 9 time units, i.e., at 9 units, 18 units, 27 units, etc. . . . As shown by curve (b) of FIG. 2, slide mechanism 11 is controlled to allow the first row of items 100 to be flipped in the manner described above, the second row of items 100 to be slid onto the transport device 20 in the manner described above, with subsequent rows alternating between being flipped and slid. A high value of curve (b) corresponds the phantom line of slide mechanism 11 of FIG. 1 and a low value corresponds to the solid line of FIG.1. In this manner, selected rows of items 100 are fed to a position wherein they are supported on retractable bar 15 against bump bar 14.

Curve (c) of FIG. 2 illustrates the state of the retractable plate 15. Specifically, the retractable plate 15 is retracted, to allow item 100 supported thereon to fall onto transport device 20, at 16 time units. Since the first row of items 100 reaches the retractable bar at 8 time units, the flipped item, i.e., the bottom item, is held on the retractable bar 15 for a settling period of 8 time units, as illustrated by curve (c) of FIG. 2. This settling period allows the any oscillatory motion of item 100, due to flipping and dropping, to dissipate. Therefore, when the retractable bar 15 is retracted at 16 time units, the item 100 can fall smoothly onto the transport device 20.

After each row of items 100 is flipped, the slide mechanism 11 is set to the slide position (the phantom line in FIG. 1). Accordingly, alternating rows of items 100 slide along primary guide surface 11A and secondary guide surface 12A and are held on secondary guide surface 12A by snubber bar 13 which is initially down (i.e., in the position indicated by the solid line in FIG. 1). Curve (e) illustrates the state of the snubber bar 13. The second row of items 100 is released at 9 time units and reaches the snubber bar 13 at 15 time units. At 21 time units, the snubber bar is raised (to the position of the phantom line in FIG. 1) to release the slid item 100 onto the transport device 20. Therefore, the slid item 100 is held for a period of 6 time units on the secondary guide surface 12A. This allows for a smooth release on the transport device 20.

In the meantime, the previously flipped row of items 100 has been transported by the transport device 20, which moves continuously, to a position wherein the flipped items 100 rest against flip gate 50 which is initially in the down position (i.e., the position indicated by the solid line of FIG. 1). As illustrated in curve (d) of FIG. 2, the flipped items 100 reach the flip gate 50 at 23 time units and the flip gate is raised at 29 time units (a hold time of 6 time units) to allow the flipped items 100 to be transported by the transport device 20 at a predetermined pitch behind the slid items 100 which were released onto the transport device 20 at 21 time units, i.e., 8 time units previous to release of the flipped items 100. Because release of the flipped items 100 is accomplished, by the flip gate 50, while the flipped items 100 are disposed directly on the transport device 20, the release time can be accurately controlled and release can be accomplished more smoothly, as opposed to dropping a moving item 100 into the transport device 20 to control release as in the conventional device. It can be seen that the addition of the flip gate 50 allows the device to operate in a manner which is fundamentally different from known devices. Because the test apparatus according to the invention was identical to the apparatus used as a conventional example, with the exception of the added gate, the increased holding time of the flipped item is attributable solely to the use of the gate.

Figure 3:
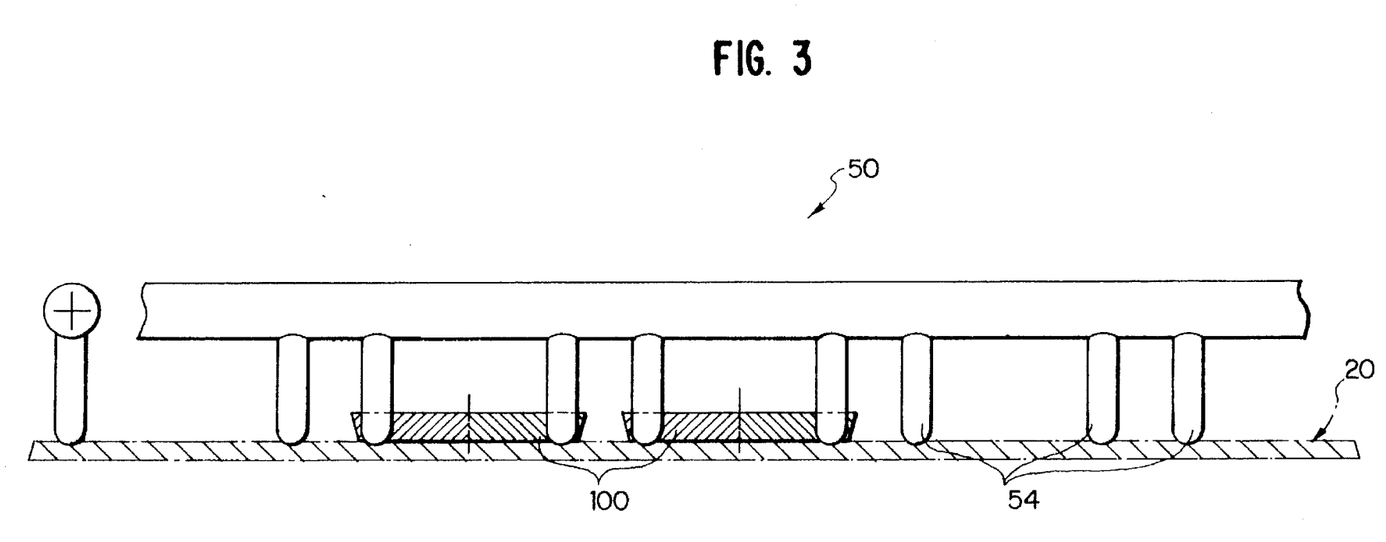
FIG. 3 illustrates the "flip gate" of the preferred embodiment in detail.

FIG. 3 illustrates the flip gate 50 as viewed from the direction of travel of items 100 on transport device 20. Specifically, flip gate 50 includes a shaft 52 supported to rotate above the transport device 20. A plurality of pins 54 extend radially from the shaft 52 and extend to the surface of the transport device 20 when the flip gate 50 is in the down position. Therefore, flipped items 100 will rest against adjacent pins 54, as illustrated, when the flip gate 50 is down. The pins 50 serve to centralize the items 100 in an appropriate lane, i.e., a position in the transverse direction of the transport device 20.

The timing of the preferred embodiment can be accomplished through known means, such as cams and cam followers, or a microprocessor based device programmed in a desired manner. The various components can be driven by known devices, such as solenoids, motors, air cylinders and the like. The invention can control both the slide and the flip process of an automatic sandwich system such that the distance between the top and bottom items, for example, within a stream (i.e., corresponding to slid and flipped items, respectively) can be a predetermined regular distance, irrespective of the speed of the run. Accordingly, an automatic sandwich manufacturing system, such as the COOKIE CAPPER sandwich system, can be operated at high-speeds without being inhibited by the problems of poor positioning and the like found in conventional devices.

While the invention has been particularly shown and described with reference to a preferred embodiment thereof, it will be understood that various changes in form and detail may be made therein without departing from the spirit and scope of the invention. For example, non-essential elements may be removed from the apparatus if so desired without detracting from the advantages derived from the unique invention disclosed herein.

Although the present invention has been described with respect to food items such as cookies, and the like, it is obvious that the novel apparatus could readily be utilized for analogous operations, not only in food processing, but in the handling of any type of item for manufacturing operations and the like.

What is claimed is:

1. An article flipping and positioning apparatus comprising:

a transport device;

a slide member operative to selectively direct the articles to one of two paths to thereby slide or flip articles transported thereto, the articles being deposited on said transport device after being slid or flipped; and a restricting device disposed proximate said transport device, said restricting device being operative to selectively retain the articles which have been flipped at a desired position on said transport device and to release the articles that have been flipped at a predetermined timing to define a desired spacing between the articles that have been flipped and the articles that have been slid, wherein said restricting device comprises a positioning surface defined by an elongated member having a plurality of pins extending therefrom, said elongated member extending across at least a portion of said transport device and being rotatably mounted to allow said pins to be selectively moved from a restricting position, wherein said pins contact the articles that have been flipped, to a release position, wherein the articles that have been flipped can freely be transported by said transport device.

2. An apparatus as claimed in claim 1, wherein adjacent pairs of said pins respectively contact the articles that have been flipped when said restricting device is in the restricting position, said adjacent pairs of pins constituting said positioning surface.

3. An article flipping and positioning apparatus comprising:

a transport device;

a primary slide member selectively movable to direct the articles to one of two paths to thereby slide or flip an article transported by an infeed conveyor unit;

a reverse slide member for receiving a flipped article and guiding the article's movement as it slides down a surface thereof;

a flip stopping unit for stopping the flipped article's movement before the article is deposited on said transport unit and subsequently depositing the flipped article on said transport device;

a secondary slide member for receiving a slid article and guiding the article's movement as it slides down a surface thereof; and a restricting gate for selectively restricting movement of the flipped article which has been deposited on the transport unit, wherein the restricting gate is controlled so that the respective positions of both said slid articles and said flipped articles on said transport device are controlled so that said flipped and slid articles are positioned on said transport device with a desired spacing therebetween.

4. An apparatus as claimed in claim 3, further comprising:

a slide stopping unit for stopping the slid article's movement down the surface of the secondary slide member so that the article is in a given position relative to the flipped article, wherein the slid article comes to rest in a registered position at a junction between said secondary slide member and said slide stopping unit, said slide stopping unit being rotatably movable so as to deposit a slid article on said transport unit, said slide stopping unit being controlled in concert with said restricting gate to position said flipped articles and said slid articles in a desired relative manner on said transport device.

5. An apparatus as claimed in claim 4, further comprising:

a plate, slidably coupled to said flip stopping unit, said plate forming a plane generally above the transport unit, wherein the flipped article comes to rest at a junction formed by said flip stopping unit and said plate.

6. An apparatus as claimed in claim 5 wherein said articles are food items.

7. A process of automatically flipping and positioning articles, comprising the steps of:

conveying a plurality of rows of articles to a first position;

selectively flipping said articles being conveyed;

a first placing step of placing unflipped articles on a transport device;

a second placing step of placing flipped articles on the transport device;

selectively restricting motion of the flipped articles while the flipped articles are disposed on the transport device to define a desired spacing between the flipped articles and the unflipped articles; and holding the flipped articles, after said selectively flipping step, for a predetermined settling period to allow oscillatory motion generated during said selectively flipping step to dissipate before said second placing step.

8. A process as claimed in claim 7 wherein said selectively flipping step comprises flipping a first row of items and subsequently allowing a second row of items to be deposited on the transport device; and wherein said selectively restricting step holds the first row of items which have been flipped on the transport device and releases the first row of items at a predetermined time so that the first row of items is positioned on the transport device behind the second row of items in a direction of travel of the transport device.

9. A process as claimed in claim 8, wherein said selectively restricting step is accomplished by a gate which comprises an elongated member having a plurality of pins extending therefrom, said elongated member extending across at least a portion of the transport device and being rotatably mounted to allow said pins to be selectively moved from a restricting position, wherein said pins contact the articles that have been flipped, to a release position, wherein the articles that have been flipped can freely be transported by said transport device.

10. A process as claimed in claim 9, wherein said articles are food items.

11. A process for flipping and positioning articles comprising:

conveying a first row of items to a first position;

flipping the first row of items and conveying said first row of items further to a second position proximate a transport device;

holding the first row of items at the second position for a predetermined settling time;

conveying a second row of items to the first position after said flipping step;

conveying the second row of items to a holding position proximate the transport device and holding the second row of items at the holding position;

depositing the second row of items on the transport device at a first predetermined time;

after said settling time has elapsed, depositing the first row of items on the transport device;

restraining the first row of items from moving after the first row of items has been deposited on the transport device; and releasing the first row of items to position the first row of items at a position behind the second row of items on the transport device with respect to a direction of movement of the transport device.

* * * * *